(12) United States Patent
Imai

(10) Patent No.: US 11,988,569 B2
(45) Date of Patent: May 21, 2024

(54) PRESSURE DETECTION DEVICE AND METHOD OF MANUFACTURING PRESSURE DETECTION DEVICE

(71) Applicant: Surpass Industry Co., Ltd., Gyoda (JP)

(72) Inventor: Hiroshi Imai, Gyoda (JP)

(73) Assignee: Surpass Industry Co., Ltd, Saitama (JP)

( * ) Notice: Subject to any disclaimer, the term of this patent is extended or adjusted under 35 U.S.C. 154(b) by 0 days.

(21) Appl. No.: 17/670,047

(22) Filed: Feb. 11, 2022

(65) Prior Publication Data
US 2022/0260445 A1 Aug. 18, 2022

(30) Foreign Application Priority Data

Feb. 12, 2021 (JP) ................ 2021-021121

(51) Int. Cl.
| | | |
|---|---|---|
| *G01L 19/00* | (2006.01) | |
| *G01L 9/00* | (2006.01) | |
| *G01L 19/14* | (2006.01) | |

(52) U.S. Cl.
CPC ............ *G01L 19/14* (2013.01); *G01L 9/0051* (2013.01)

(58) Field of Classification Search
None
See application file for complete search history.

(56) References Cited

U.S. PATENT DOCUMENTS

| | | | |
|---|---|---|---|
| 2011/0138921 A1* | 6/2011 | Colombo | G01L 19/147 73/706 |
| 2017/0370792 A1* | 12/2017 | Hasunuma | G01L 19/0627 |
| 2018/0120186 A1* | 5/2018 | Imai | G01L 9/0041 |

FOREIGN PATENT DOCUMENTS

JP  2018-072106 A  5/2018

\* cited by examiner

*Primary Examiner* — Brandi N Hopkins
*Assistant Examiner* — Nigel H Plumb
(74) *Attorney, Agent, or Firm* — Muncy, Geissler, Olds & Lowe, P.C.

(57) ABSTRACT

Provided is a pressure detection device including a pressure detection unit and a channel unit. The channel unit has a contact part arranged in contact with the pressure detection unit, the contact part has a protective film arranged in contact with a pressure detection surface and configured to block contact between the pressure detection surface and a liquid and a body forming an opening arranged at an end of the channel, the protective film and the body are formed of a thermoplastic fluorine resin, and the protective film is arranged so as to close the opening of the body and welded to the body in an annular region extending circumferentially about the axis.

4 Claims, 9 Drawing Sheets

PRESSURE DETECTION DEVICE AND METHOD OF MANUFACTURING PRESSURE DETECTION DEVICE

CROSS-REFERENCE TO RELATED APPLICATIONS

This application is based on Japanese Patent Application No. 2021-021121 filed on Feb. 12, 2021, the contents of which are incorporated herein by reference in its entirety.

BACKGROUND

1. Technical Field

The present disclosure relates to a pressure detection device that detects the pressure of a liquid flowing through a channel and a method of manufacturing the pressure detection device.

2. Description of Related Art

Conventionally, pressure detection devices are known that include a housing formed with a channel to which a liquid such as a chemical solution is guided and a sensor element that detects the pressure of a liquid transferred to a pressure-sensitive part in contact with the liquid guided in the channel (see Japanese Patent Application Laid-Open No. 2018-72106, for example). The pressure detection device disclosed in Japanese Patent Application Laid-Open No. 2018-72106 has a pressure detection unit having a diaphragm forming a pressure detection surface and a channel unit forming a channel and being in contact with the pressure detection unit.

The pressure detection device disclosed in Japanese Patent Application Laid-Open No. 2018-72106 is a device in which a thin film-like protective film is arranged between the diaphragm and the channel unit, and an O-ring is arranged in a recess groove provided in a surface of the channel unit facing the pressure detection unit.

This pressure detection device prevents a liquid guided in the channel from entering the inside of the pressure detection unit by using an annular seal region formed by contact between the protective film and the O-ring.

BRIEF SUMMARY

When an O-ring formed of a rubber or the like is used as seen in the pressure detection device disclosed in Japanese Patent Application Laid-Open No. 2018-72106, however, contact between the O-ring and a chemical solution such as hydrofluoric acid causes metal ions to be eluted in the chemical solution, for example, which may deteriorate the quality of the chemical solution.

The present disclosure has been made in view of such circumstances and intends to provide a pressure detection device that can suppress liquid quality deterioration due to elution of metal ions.

The present disclosure employs the following solutions in order to solve the problem described above.

A pressure detection device according to one aspect of the present disclosure includes: a pressure detection part having a pressure detection surface configured to detect a pressure of a liquid; and a channel part in which a channel configured to guide a liquid to the pressure detection surface and extending along an axis is formed. The channel part has a contact part arranged in contact with the pressure detection part, the contact part has a protective part arranged in contact with the pressure detection surface and configured to block contact between the pressure detection surface and a liquid and a body forming an opening arranged at an end of the channel, the protective part and the body are formed of a thermoplastic fluorine resin, and the protective part is arranged so as to close the opening of the body and welded to the body in an annular region extending circumferentially about the axis.

According to the pressure detection device of one aspect of the present disclosure, a liquid guided by the channel part having the channel extending along the axis is guided to the pressure detection surface included in the pressure detection part, and thereby the pressure of the liquid is detected. Since contact between the pressure detection surface and a liquid is blocked by the protective part, direct contact of the liquid to the pressure detection surface can be prevented. The protective part is arranged so as to close the opening arranged at the end of the channel formed by the channel part and welded to the body of the contact part in the annular region extending circumferentially about the axis.

Since the protective part and the body are formed of a thermoplastic fluorine resin, respectively, the weld part where the protective part and the body are melted together is formed. In the weld part, no other material from which a metal ion is eluted is present. Thus, no metal ion is eluted even if a liquid guided to the pressure detection surface enters the weld part, and liquid quality deterioration due to metal ion elution can be suppressed.

In the pressure detection device according to one aspect of the present disclosure, it is preferable that the opening be formed in a cylindrical shape having a predetermined inner diameter extending along the axis and that a position of the opening on an inner circumferential surface and a position of an end on an inner circumference side of the annular region match in a radial direction orthogonal to the axis.

According to the pressure detection device of such a configuration, since the position of the opening on the inner circumferential surface and the position of the end on the inner circumference side of the annular region match, there is no unwelded contact region between the protective part and the body. This prevents a situation where particles contained in a liquid are deposited in an unwelded contact region between the protective part and the body and the deposited particles flow out and deteriorate the essential quality of the liquid.

In the pressure detection device according to one aspect of the present disclosure, it is preferable that the thermoplastic fluorine resin be a perfluoroalkoxy fluorine resin (PFA).

According to the pressure detection device of such a configuration, since the protective part and the body are formed of a perfluoroalkoxy fluorine resin (PFA), the weld part having high adhesive strength can be stably formed.

In the pressure detection device according to one aspect of the present disclosure, it is preferable that a width of the annular region in a radial direction orthogonal to the axis (X) be greater than or equal to 0.5 mm and less than or equal to 1.5 mm.

According to the pressure detection device of such a configuration, the width of the annular region is greater than or equal to 0.5 mm and less than or equal to 1.5 mm, and thereby the durability of the seal function provided by the annular region can be sufficiently enhanced.

A method of manufacturing a pressure detection device according to one aspect of the present disclosure is a method of manufacturing a pressure detection device including a pressure detection part having a pressure detection surface configured to detect a pressure of a liquid and a channel part in which a channel configured to guide a liquid to the pressure detection surface and extending along an axis is formed, the channel part has a contact part arranged in contact with the pressure detection part, the contact part has a protective part arranged in contact with the pressure detection surface and configured to block contact between the pressure detection surface and a liquid and a body forming an opening arranged at an end of the channel, and the protective part and the body are formed of a thermoplastic fluorine resin. The method includes: a step of arranging the protective part so as to close the opening of the body; and a welding step of irradiating the protective part with a laser beam circumferentially about the axis to form an annular region where the protective part and the body are welded together.

According to the method of manufacturing the pressure detection device of one aspect of the present disclosure, the protective part is arranged so as to close the opening arranged at the end of the channel formed by the channel part and welded to the body of the channel part in the annular region extending circumferentially about the axis.

Since the protective part and the body are formed of a thermoplastic fluorine resin, respectively, the weld part where the protective part and the body are melted together is formed. In this weld part, no other material from which a metal ion is eluted is present. Thus, no metal ion is eluted even if a liquid guided to the pressure detection surface enters the weld part, and liquid quality deterioration due to metal ion elution can be suppressed.

In the method of manufacturing the pressure detection device according to one aspect of the present disclosure, it is preferable that the opening be formed in a cylindrical shape having a predetermined inner diameter extending along the axis and that the welding step include welding the protective part and the body to each other such that a position of the opening on an inner circumferential surface and a position of an end on an inner circumference side of the annular region match in a radial direction orthogonal to the axis.

According to the method of manufacturing the pressure detection device of such a configuration, since the protective part and the body are welded together such that the position of the opening on the inner circumferential surface and the position of the end on the inner circumference side of the annular region match, there is no unwelded contact region between the protective part and the body. This prevents a situation where particles contained in a liquid are deposited in an unwelded contact region between the protective part and the body and the deposited particles flow out and deteriorate the essential quality of the liquid.

In the method of manufacturing the pressure detection device according to one aspect of the present disclosure, it is preferable that the thermoplastic fluorine resin be a perfluoroalkoxy fluorine resin (PFA).

According to the method of manufacturing the pressure detection device of such a configuration, since the protective part and the body are formed of a perfluoroalkoxy fluorine resin (PFA), the weld part having high adhesive strength can be stably formed.

In the method of manufacturing the pressure detection device according to one aspect of the present disclosure, it is preferable that a width of the annular region in a radial direction orthogonal to the axis be greater than or equal to 0.5 mm and less than or equal to 1.5 mm.

According to the method of manufacturing the pressure detection device of such a configuration, the width of the annular region is greater than or equal to 0.5 mm and less than or equal to 1.5 mm, and thereby the durability of the seal function provided by the annular region can be sufficiently enhanced.

According to the present disclosure, a pressure detection device that can suppress liquid quality deterioration due to elution of metal ions can be provided.

DETAILED DESCRIPTION

Figure 1:
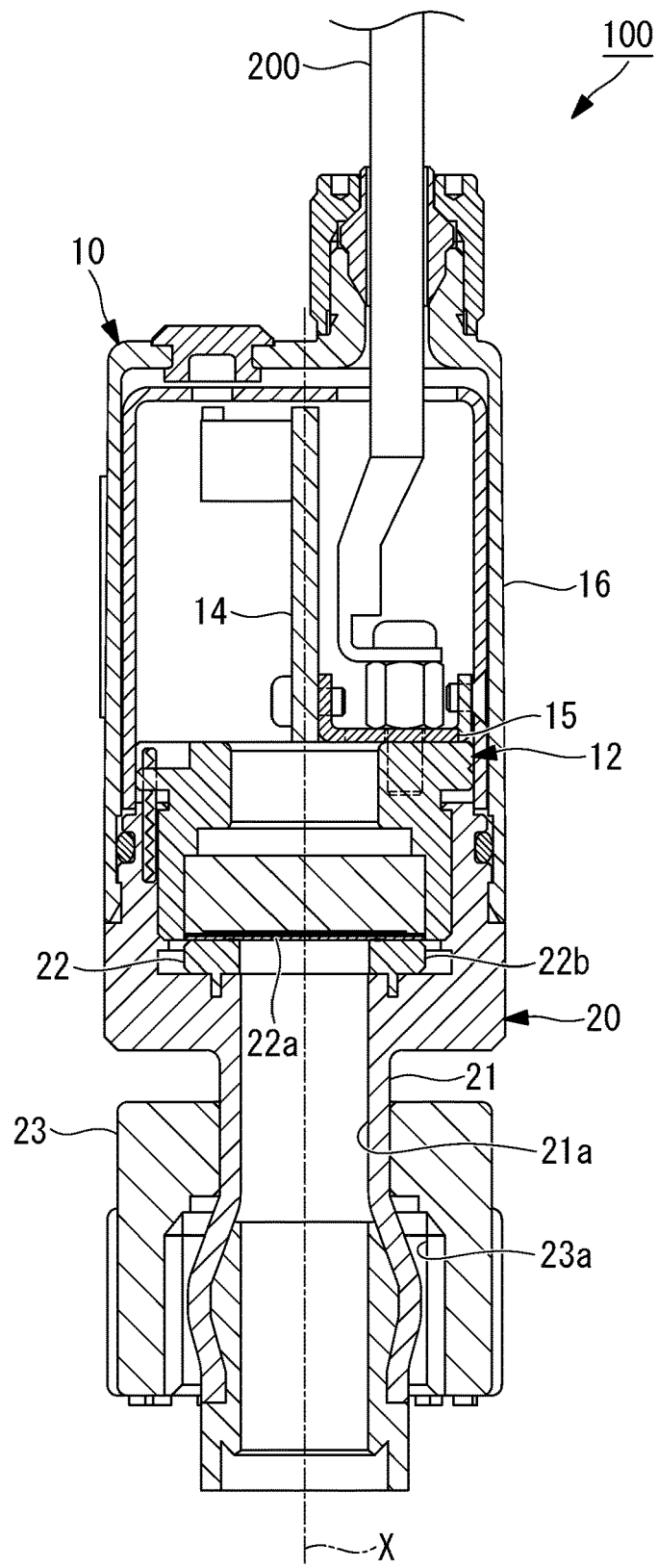
FIG. 1 is a longitudinal sectional view illustrating a pressure detection device of one embodiment of the present disclosure.
Figure 2:
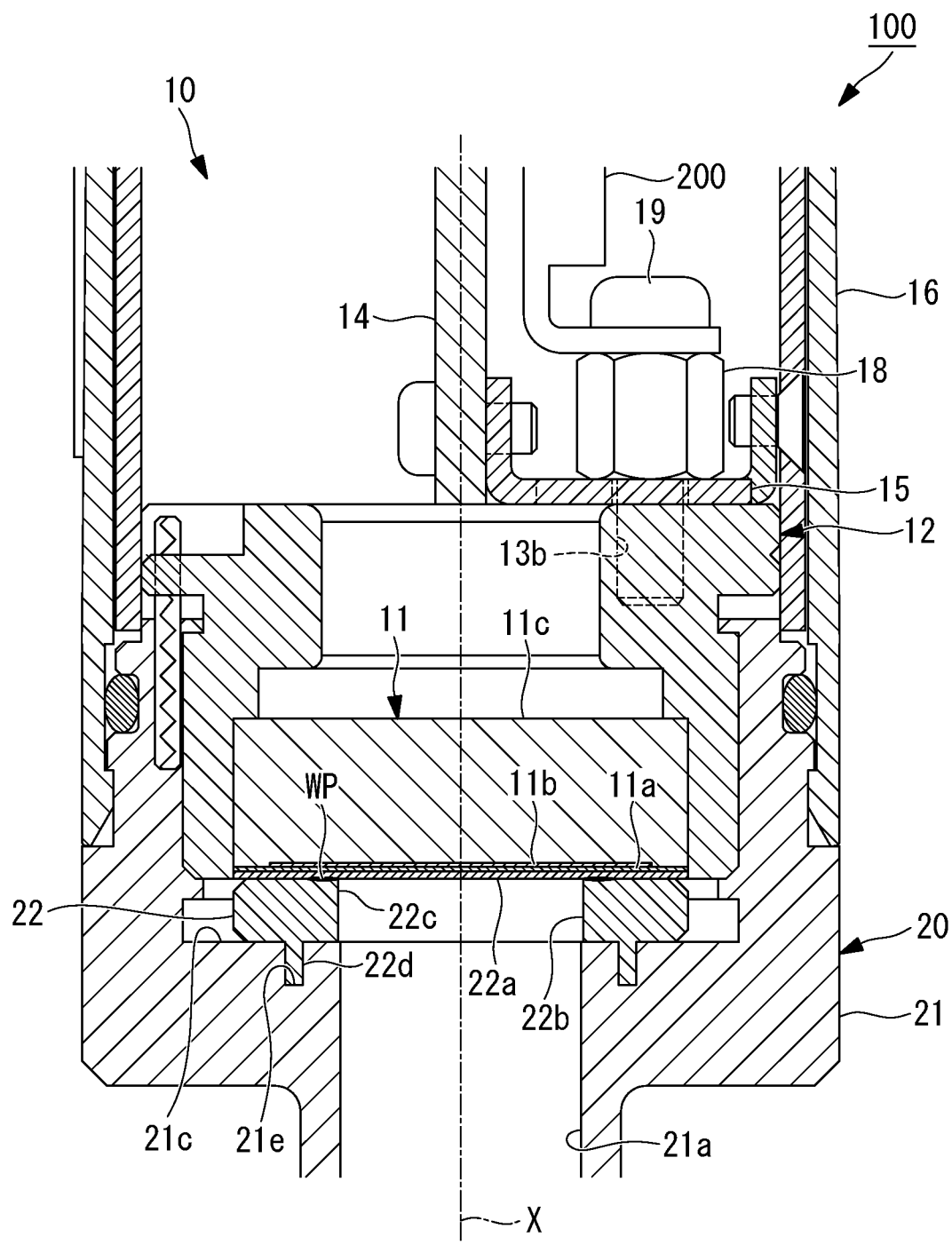
FIG. 2 is a partial enlarged view of the pressure detection device illustrated in FIG. 1.
Figure 3:
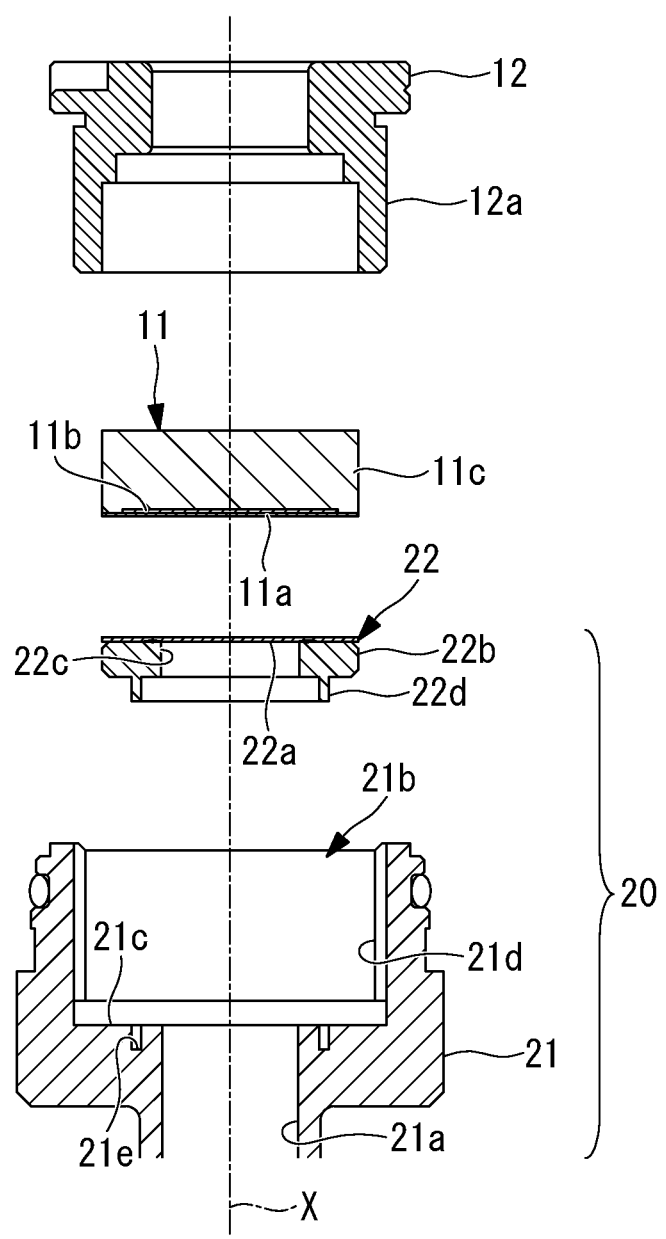
FIG. 3 is an exploded view of the pressure detection device illustrated in FIG. 1.

A pressure detection device 100 of one embodiment of the present disclosure will be described below based on the drawings. FIG. 1 is a longitudinal sectional view illustrating the pressure detection device of one embodiment of the present disclosure. FIG. 2 is a partial enlarged view of the pressure detection device 100 illustrated in FIG. 1. FIG. 3 is an exploded view of the pressure detection device 100 illustrated in FIG. 1.

As illustrated in FIG. 1 and FIG. 2, the pressure detection device 100 of the present embodiment includes a pressure detection unit 10 that detects the pressure of a liquid and a channel unit 20 having a channel body 21 in which a channel 21a is formed. The channel 21a is formed so as to guide a liquid to a diaphragm (pressure detection surface) 11a of the pressure detection unit 10 and extend along the axis X.

The channel 21a is connected to a channel (not illustrated) branched from a pipe (not illustrated) through which a fluid flows. The liquid in the present embodiment is a chemical solution, a solvent, pure water, or the like used in a semiconductor manufacturing process performed by a semiconductor manufacturing apparatus.

Next, the channel unit 20 included in the pressure detection device 100 of the present embodiment will be described.

The channel unit 20 has the channel body 21, a contact part 22, and a nut 23. As illustrated in FIG. 3, the channel body 21 is formed with a recess 21b, and the inner circumferential surface of the recess 21b is formed with an internal thread 21d.

Further, as illustrated in FIG. 2, a bottom surface (accommodating part) 21c of the recess 21b is an accommodating part that accommodates the contact part 22. The bottom surface 21c is formed with an annular groove 21e extending circumferentially about the axis X. A protrusion 22d of the contact part 22 is inserted in the groove 21e. The protrusion 22d is inserted in the groove 21e, and thereby a seal region is formed that seals the channel 21a so that a liquid inside the channel 21a does not leak to the pressure detection unit 10 side.

The channel 21a extending straight along the axis X is formed inside the channel body 21, and the channel body 21 is formed of a fluorine resin material such as polytetrafluoroethylene (PTFE), polychlorotrifluoroethylene (PCTFE), perfluoroalkoxy fluorine resin (PFA), or the like.

Figure 4:
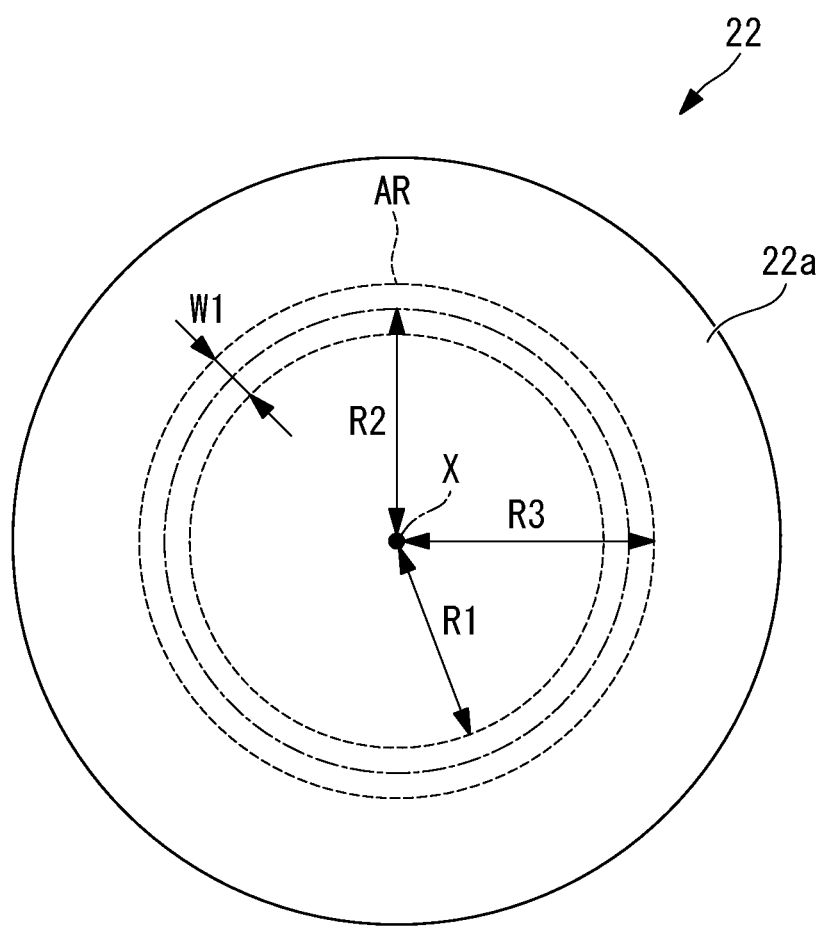
FIG. 4 is a plan view of a contact part illustrated in FIG. 3 when viewed from above along an axis.
Figure 5:
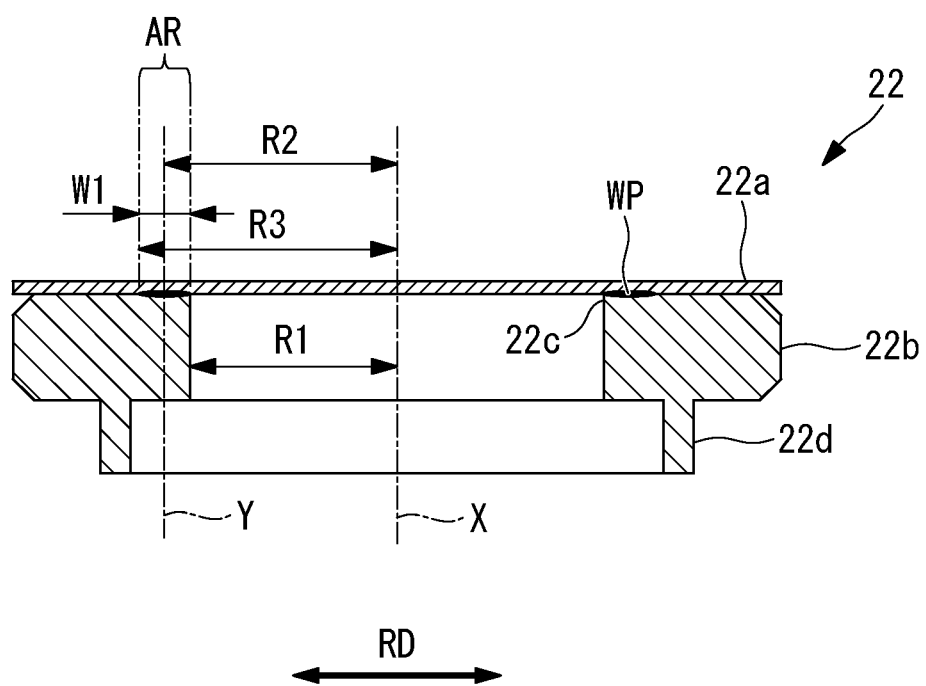
FIG. 5 is a longitudinal sectional view of the contact part illustrated in FIG. 3.

The contact part 22 is a member arranged in contact with a pressure sensor 11 described later, as illustrated in FIG. 1 and FIG. 2. The contact part 22 is arranged in a region facing a pressure detection surface formed of a diaphragm 11a and a strain gauge 11b of the pressure sensor 11. The contact part 22 has a protective film (protective part) 22a and a body 22b. FIG. 4 is a plan view of the contact part 22 illustrated in FIG. 3 when viewed from above along the axis. FIG. 5 is a longitudinal sectional view of the contact part 22 illustrated in FIG. 3.

The protective film 22a is a thin film-like member that is arranged in contact with the diaphragm 11a of the pressure sensor 11 and blocks contact between the diaphragm 11a and a liquid. The protective film 22a is formed of a perfluoroalkoxy fluorine resin (PFA) that is a thermoplastic fluorine resin. As illustrated in FIG. 4, the protective film 22a is formed in a circular shape in plan view along the axis X. The protective film 22a has a thickness that is greater than or equal to 0.05 mm and less than or equal to 2.5 mm, preferably, has a thickness that is greater than or equal to 0.05 mm and less than or equal to 0.1 mm.

The body 22b is a member formed annularly about the axis X and forming an opening 22c arranged at the end of the channel 21a. The body 22b is formed of a perfluoroalkoxy fluorine resin (PFA) that is a thermoplastic fluorine resin. The body 22b is formed with an annular protrusion 22d extending circumferentially about the axis X. As illustrated in FIG. 5, an opening 22c is a hole extending along the axis X and formed in a cylindrical shape having an inner radius R1 about the axis X.

As illustrated in FIG. 4 and FIG. 5, the protective film 22a is arranged so as to close the opening 22c of the body 22b. Further, the protective film 22a is welded to the body 22b in an annular region AR extending circumferentially about the axis X. The weld part WP illustrated in FIG. 2 represents an integrated portion where the protective film 22a and the body 22b formed of the same material are melted together. The weld part WP is formed by irradiating the protective film 22a with a laser beam (for example, a carbon dioxide gas laser beam) from above the protective film 22a.

As illustrated in FIG. 4 and FIG. 5, the annular region AR is a region whose end on the inner circumference side has an inner radius R1 and whose end on the outer circumference side has an inner radius R3 in the radial direction RD orthogonal to the axis X. As illustrated in FIG. 4, the position of the opening 22c on the inner circumferential surface and the position of the end on the inner circumference side of the annular region AR match in the radial direction RD. The inner radius R2 is the inner radius of the center position of the annular region AR (the position on which the axis Y parallel to the axis X passes) and satisfies the following equation (1).

$$R2 = (R1 + R3)/2 \quad (1)$$

As illustrated in FIG. 4 and FIG. 5, the annular region AR has a width W1 in the radial direction RD. The width W1 is set to be any value within a range of the following equation (2).

$$0.5 \text{ mm} \leq W1 \leq 1.5 \text{ mm} \quad (2)$$

The range of equation (2) is a range set such that the durability of the seal function provided by the annular region AR can be sufficiently enhanced and the width of the annular region AR is not increased than is needed.

The nut 23 is a member that connects the channel body 21 to a channel (not illustrated) branched from a pipe (not illustrated) through which a fluid passes. The internal thread 23a formed in the inner circumferential surface of the nut 23 is fastened into an external thread (not illustrated) formed in the outer circumferential surface of the branched channel, and thereby the channel 21a of the channel body 21 and the branched channel are connected to each other.

Next, the pressure detection unit 10 included in the pressure detection device 100 of the present embodiment will be described.

The pressure detection unit 10 is a device that detects the pressure of a liquid transferred to the diaphragm 11a.

As illustrated in FIG. 1 and FIG. 2, the pressure detection unit 10 includes the pressure sensor (pressure detection unit) 11 that detects the pressure of a liquid, a sensor holder 12, a sensor substrate 14, a substrate holding member 15, and a housing 16. Respective components included in the pressure detection unit 10 will be described below.

As illustrated in FIG. 2, the pressure sensor 11 includes the diaphragm 11a formed in a thin film, a strain gauge 11b that is a resistor attached to the diaphragm 11a, and a base part 11c that holds the diaphragm 11a. The pressure sensor 11 is a strain gauge type pressure sensor that outputs a pressure signal in accordance with the resistance of the strain gauge 11b that varies in accordance with the pressure transferred to the diaphragm 11a. The diaphragm 11a and the strain gauge 11b form a pressure detection surface that detects the pressure of a liquid.

The diaphragm 11a has the under surface in contact with the protective film 22a and the upper surface not in contact with the protective film 22a, and the strain gauge 11b is attached to the upper surface. The diaphragm 11a is formed of a nonconductive material having corrosion resistance and chemical resistance (for example, sapphire, ceramics, or the like).

As illustrated in FIG. 3, the sensor holder 12 is a member formed cylindrically about the axis X, and an external thread 12a is formed in the outer circumferential surface. The sensor holder 12 fixes the positions of the pressure sensor 11 and the contact part 22 in the axis X direction when the external thread 12a formed on the outer circumferential surface is fastened into the internal thread 21d formed in the inner circumferential surface of the recess 21b with the contact part 22 being accommodated in the bottom surface 21c of the recess 21b (see FIG. 3) formed in the channel body 21. Since the external thread 12a and the internal thread 21d are fastened together, the diaphragm 11a of the pressure sensor 11 and the protective film 22a of the contact part 22 come into contact with each other with a predetermined pressing force being applied.

The sensor substrate 14 has an amplifier circuit (not illustrated) that amplifies a pressure signal output by the pressure sensor 11, an interface circuit that transfers the pressure signal amplified by the amplifier circuit to a pressure signal line (not illustrated) of a cable 200 (see FIG. 1, FIG. 2), and a power supply circuit (not illustrated) that transfers, to the pressure sensor 11, a power source voltage externally supplied via the cable 200.

The substrate holding member 15 is a member that holds the sensor substrate 14 with respect to the sensor holder 12. As illustrated in FIG. 2, the substrate holding member 15 is fastened into a fastening hole 13b, which is formed in the upper surface of the sensor holder 12, by a fastening screw 19 together with an interposed spacer 18.

Figure 6:
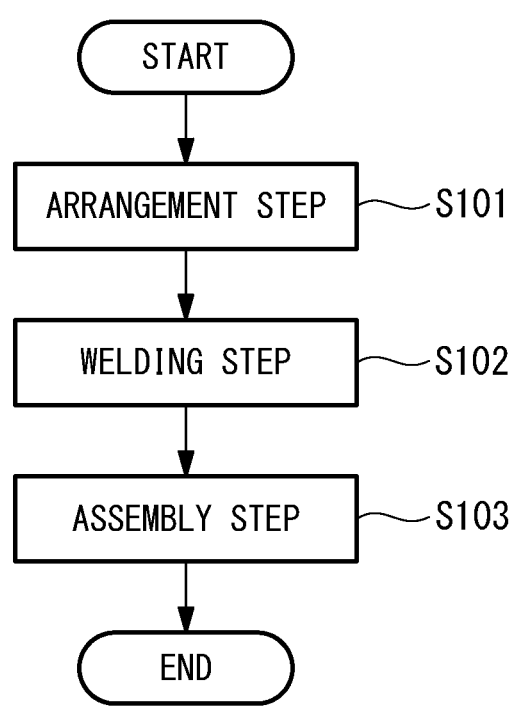
FIG. 6 is a flowchart illustrating a method of manufacturing the pressure detection device of one embodiment of the present disclosure.
Figure 7:
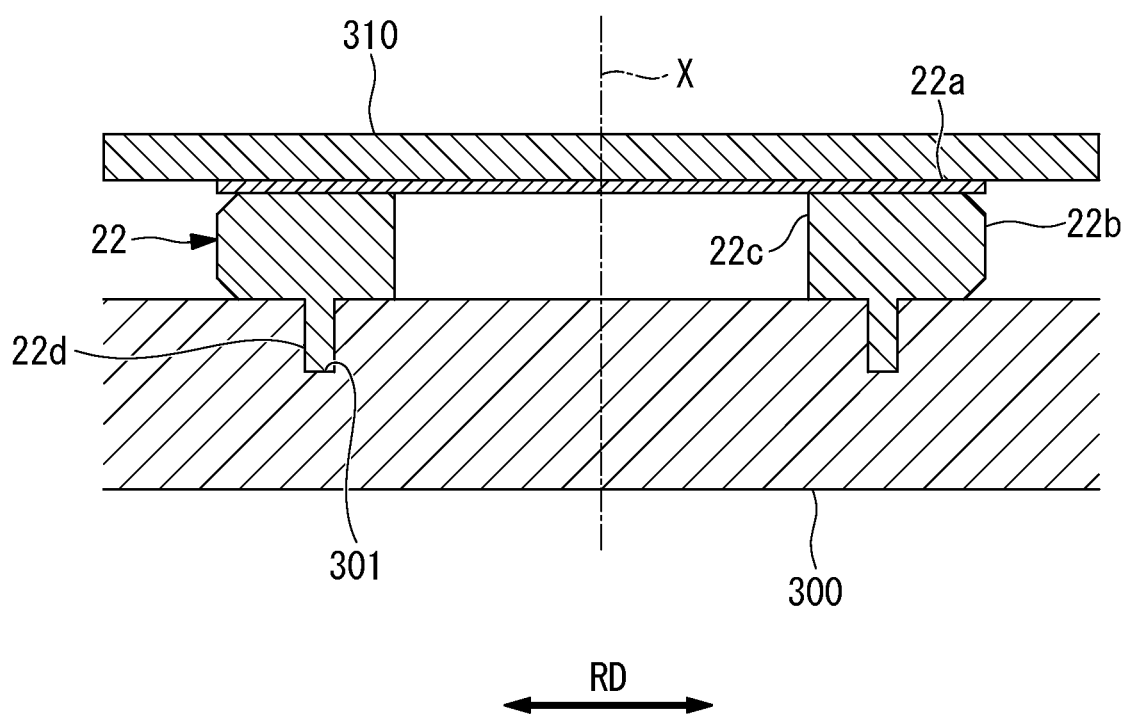
FIG. 7 is a longitudinal sectional view illustrating a state where a protective film of the contact part is arranged in a body of the contact part.
Figure 8:
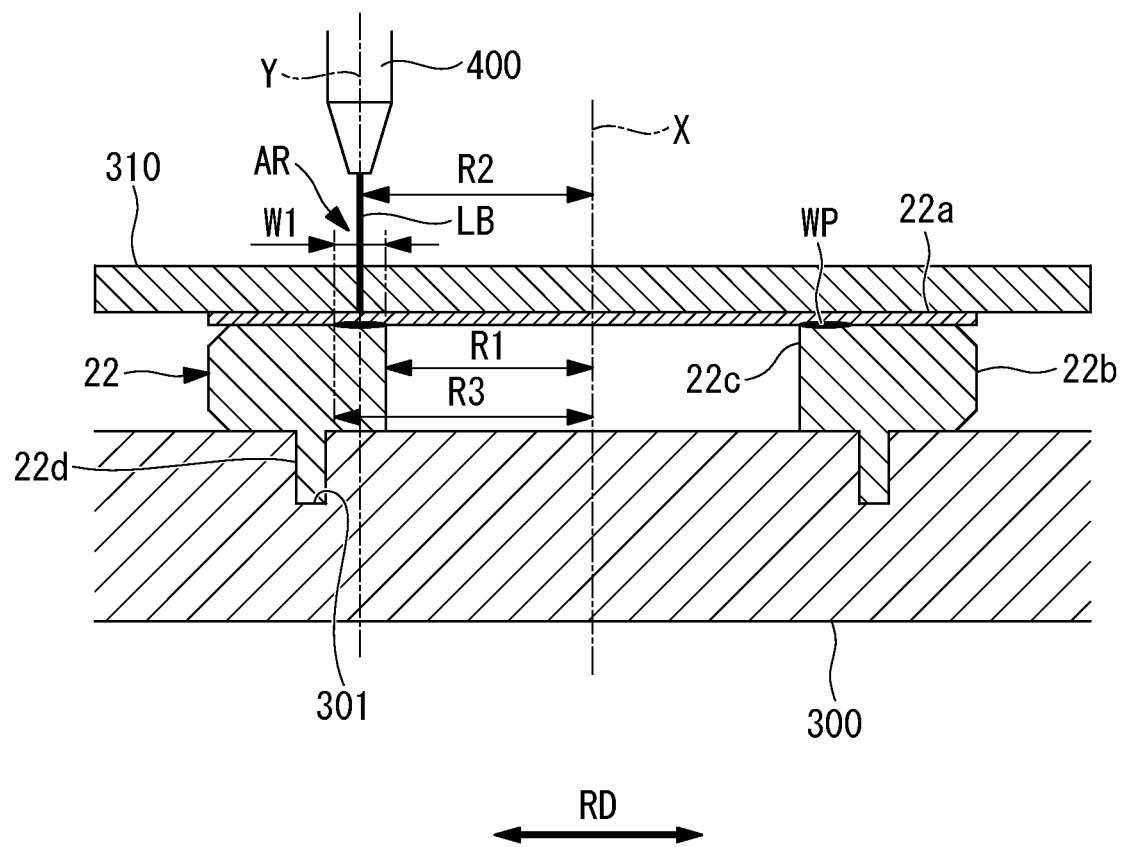
FIG. 8 is a longitudinal sectional view illustrating a welding step of welding the body of the contact part and the protective film of the contact part to each other.

Next, a manufacturing method of manufacturing the pressure detection device 100 of the present embodiment will be described with reference to the drawings. FIG. 6 is a flowchart illustrating a method of manufacturing the pressure detection device 100 of the present embodiment. FIG. 7 is a longitudinal sectional view illustrating a state where the protective film 22a of the contact part 22 is arranged in a body 22b of the contact part 22. FIG. 8 is a longitudinal sectional view illustrating a welding step of welding the body 22b of the contact part 22 and the protective film 22a of the contact part 22 to each other.

In an arrangement step of step S101, a worker arranges the body 22b to a welding tool 300 and arranges the protective film 22a to close the opening 22c of the body 22b. A groove 301 formed in a circular ring shape extending circumferentially about the axis X is formed in the welding tool 300. The worker fixes the body 22b to the welding tool 300 by inserting, in the groove 301, the protrusion 22d formed in the body 22b.

In the arrangement step, the worker arranges the protective film 22a on the upper surface of the body 22b fixed to the welding tool 300 so that the center axis of the protective film 22a matches the axis X. The worker further arranges a glass plate 310 so that the glass plate 310 comes into contact with the entire upper surface of the protective film 22a.

The glass plate 310 is formed of quartz glass, for example, but may be of another form. Instead of the glass plate 310, a plate formed of another material (for example, germanium) having transparency and high transmittance may be used. In particular, use of a plate formed of germanium whose both sides are coated with an anti-reflection film can enhance the transmission characteristics of a laser beam.

The glass plate 310 is arranged for the purpose of drawing heat from the upper surface of the protective film 22a in contact with the glass plate 310 when the contact interface between the body 22b and the protective film 22a is heated by a laser beam emitted from above the glass plate 310. Drawing heat from the upper surface of the protective film 22a in contact with the glass plate 310 prevents formation of an uneven shape due to welding of the upper surface of the protective film 22a. This makes it possible to maintain the pressure transfer property from the protective film 22a to the diaphragm 11a to be constant.

In a welding step of step S102, a laser beam LB is emitted to the protective film 22a circumferentially about the axis X to form the annular region AR where the protective film 22a and the body 22b are welded together. As illustrated in FIG. 8, a laser irradiation apparatus 400 is installed at a position distant from the axis X by the inner radius R2 in the radial direction RD (a position on which the axis Y parallel to the axis X passes) in a state where the contact part 22 is fixed to the welding tool 300 and the glass plate 310 is arranged to the contact part 22. The laser irradiation apparatus 400 is then moved circumferentially about the axis X in a state where the position distant from the axis X by the inner radius R2 in the radial direction RD is maintained.

The laser irradiation apparatus 400 emits the laser beam LB to the contact part 22 along the position of the inner radius R2 illustrated in FIG. 4 over one round about the axis X. The weld part WP where the PFA is melted together that is a thermoplastic fluorine resin forming the protective film 22a and the body 22b is formed to the contact part 22 by irradiation of the laser beam LB. The weld part WP is formed only near the contact interface where the protective film 22a and the body 22b are in contact with each other but not formed at the interface where the protective film 22a and the glass plate 310 are in contact with each other.

As illustrated in FIG. 8, in the welding step, the laser irradiation apparatus 400 welds the protective film 22a and the body 22b to each other such that the position of the opening 22c on the inner circumferential surface and the position of the end on the inner circumference side of the annular region AR match in the radial direction RD. Further, in the welding step, the laser irradiation apparatus 400 welds the protective film 22a and the body 22b to each other such that the width W1 of the annular region AR in the radial direction RD is greater than or equal to 0.5 mm and less than or equal to 1.5 mm.

Herein, the laser irradiation apparatus 400 is an apparatus that emits a carbon dioxide gas laser beam, for example. The laser irradiation apparatus 400 emits the laser beam LB with an output range that is greater than or equal to 7.5 W and less than or equal to 10.5 W, for example. Further, the laser irradiation apparatus 400 moves while emitting a laser beam circumferentially at a velocity that is faster than or equal to 2 mm/second and slower than or equal to 11 mm/second. The laser irradiation apparatus 400 irradiates the position at the inner radius R2 from the axis X with the laser beam LB by one round.

In an assembly step of step S103, the worker assembles respective components of the pressure detection device 100 including the contact part 22 formed of the protective film 22a and the body 22b welded together to obtain the state illustrated in FIG. 1. Specifically, the worker attaches the contact part 22 to the channel body 21 and arranges the pressure sensor 11 to the contact part 22. The worker then fastens the external thread 12a of the sensor holder 12 into the internal thread 21d of the channel body 21 and obtains a state where the diaphragm 11a of the pressure sensor 11 comes into contact with the protective film 22a of the contact part 22.

Effects and advantages achieved by the pressure detection device 100 of the present embodiment described above will be described.

According to the pressure detection device 100 of the present embodiment, a liquid guided by the channel unit 20 having the channel 21a extending along the axis X is guided to the diaphragm 11a that is a pressure detection surface included in the pressure detection unit 10, and thereby the pressure of the liquid is detected. Since contact between the diaphragm 11a and the liquid is blocked by the thin film-like protective film 22a, direct contact of a liquid to the diaphragm 11a is prevented. The protective film 22a is arranged so as to close the opening 22c arranged at the end of the channel 21a formed by the channel unit 20 and welded to the body 22b of the contact part 22 in the annular region AR extending circumferentially about the axis X.

Since the protective film 22a and the body 22b are formed of PFA that is a thermoplastic fluorine resin, respectively, the weld part WP where the protective film 22a and the body 22b are melted together is formed. In the weld part WP, no other material from which a metal ion is eluted is present. Thus, no metal ion is eluted even if a liquid guided to the pressure detection surface enters the weld part WP, and liquid quality deterioration due to elution of metal ions can be suppressed.

Further, according to the pressure detection device 100 of the present embodiment, since the position of the opening 22c on the inner circumferential surface and the position of the end on the inner circumference side of the annular region AR match, there is no unwelded contact region between the protective film 22a and the body 22b. This prevents a situation where particles contained in a liquid are deposited in an unwelded contact region between the protective film 22a and the body 22b and the deposited particles flow out and deteriorate the essential quality of the liquid.

Further, according to the pressure detection device 100 of the present embodiment, since the protective film 22a and the body 22b are formed of perfluoroalkoxy fluorine resin (PFA), the weld part WP having high adhesive strength can be stably formed.

Further, according to the pressure detection device of the present embodiment, the width W1 of the annular region AR is greater than or equal to 0.5 mm and less than or equal to 1.5 mm, and thereby the durability of the seal function provided by the annular region AR can be sufficiently enhanced.

OTHER EMBODIMENTS

Although, in the above description, the pressure detection device 100 has been illustrated as the channel unit 20 having the channel body 21 and the contact part 22 that is a separate member from the channel body 21 and is fixed to the channel body 21, another form may be employed. For example, a pressure detection device 100A as illustrated in FIG. 9 may be employed.

Figure 9:
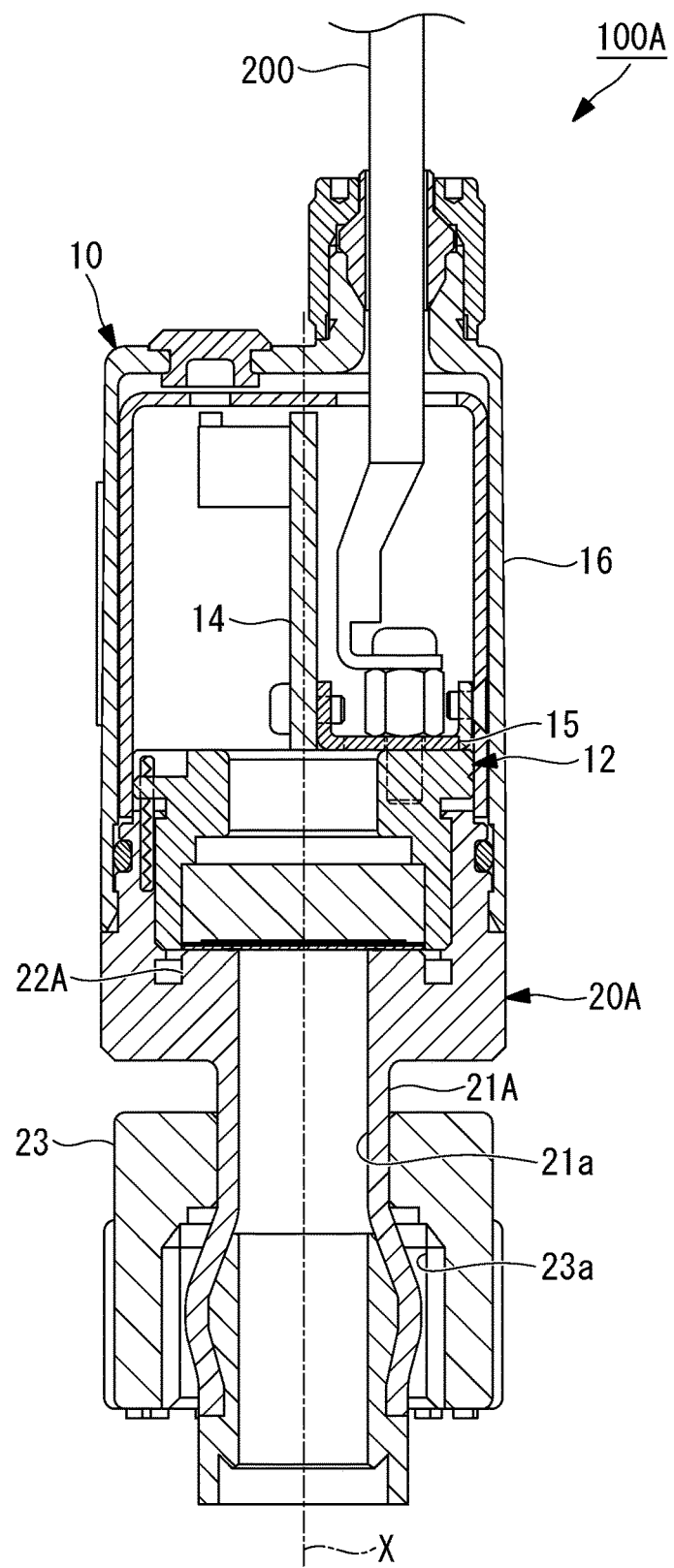
FIG. 9 is a longitudinal sectional view illustrating a pressure detection device of another embodiment.

The pressure detection device 100A illustrated in FIG. 9 is a modified example of the pressure detection device 100 illustrated in FIG. 1 and is the same as the pressure detection device 100 illustrated in FIG. 1 except for features particularly described below. The pressure detection device 100A illustrated in FIG. 9 includes a channel unit 20A formed with the channel 21a. The channel unit 20A has a channel body 21A, a contact part 22A, and the nut 23. The channel body 21A and the contact part 22A are integrally molded by perfluoroalkoxy fluorine resin (PFA) that is a thermoplastic fluorine resin.

According to the pressure detection device 100A illustrated in FIG. 9, since the channel body 21A and the contact part 22A are integrally formed of PFA, it is possible to reliably suppress malfunction of leakage of a liquid from a contact portion where the channel body 21 and the contact part 22 are in contact with each other than in a case where these components are formed and assembled as separate members.

What is claimed is:

1. A pressure detection device comprising:
   a pressure detection part having a pressure detection surface configured to detect a pressure of a liquid; and
   a channel part in which a channel configured to guide a liquid to the pressure detection surface and extending along an axis is formed,
   wherein the channel part has a contact part arranged in contact with the pressure detection part,
   wherein the contact part has
   a protective part arranged in contact with the pressure detection surface and configured to block contact between the pressure detection surface and a liquid, and
   a body forming an opening arranged at an end of the channel,
   wherein the protective part and the body are formed of a thermoplastic fluorine resin, and
   wherein the protective part is arranged so as to close the opening of the body and welded to the body in an annular region extending circumferentially about the axis.

2. The pressure detection device according to claim 1, wherein the opening is formed in a cylindrical shape having a predetermined inner diameter extending along the axis, and
   wherein a position of the opening on an inner circumferential surface and a position of an end on an inner circumference side of the annular region match in a radial direction orthogonal to the axis.

3. The pressure detection device according to claim 1, wherein the thermoplastic fluorine resin is a perfluoroalkoxy fluorine resin.

4. The pressure detection device according to claim 1, wherein a width of the annular region in a radial direction orthogonal to the axis is greater than or equal to 0.5 mm and less than or equal to 1.5 mm.

* * * * *